April 20, 1965 R. H. PECKWORTH 3,179,336
MULTI-ODOMETER FOR VEHICLES
Filed Feb. 18, 1963 3 Sheets-Sheet 2
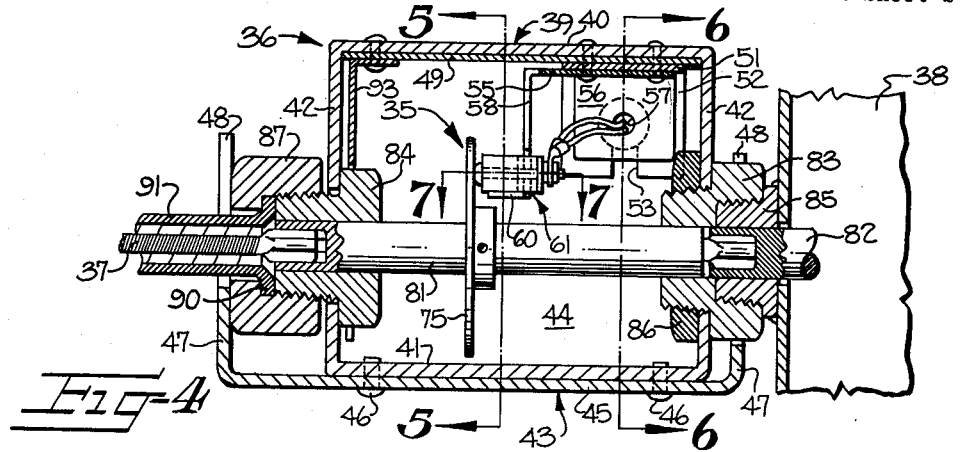
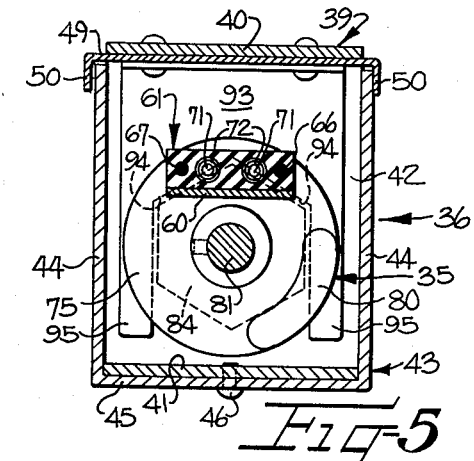
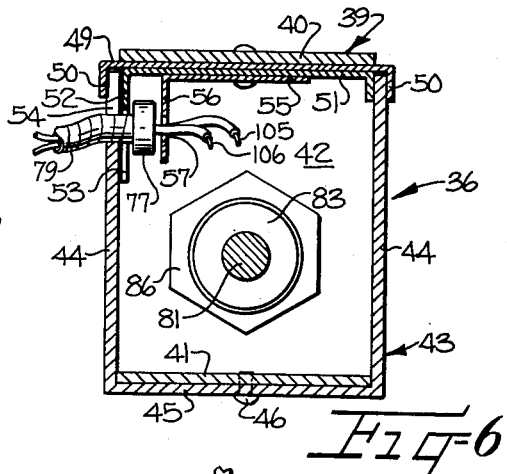
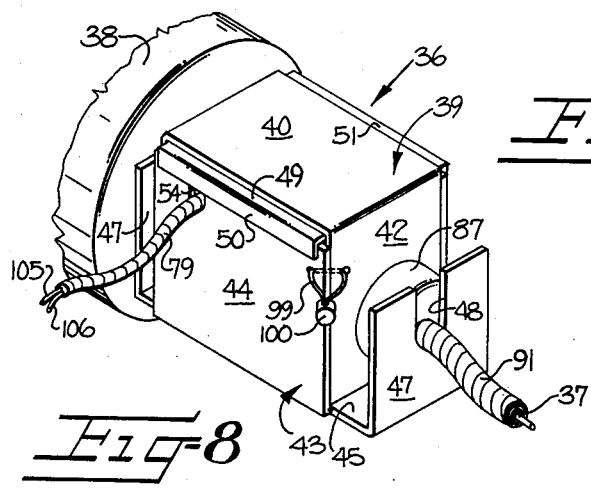
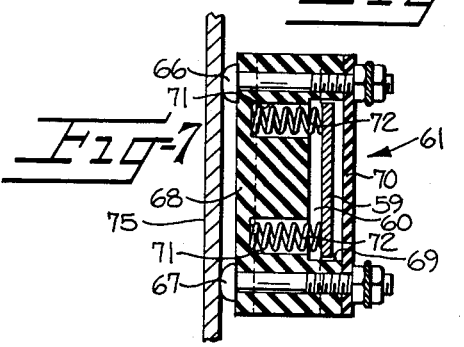
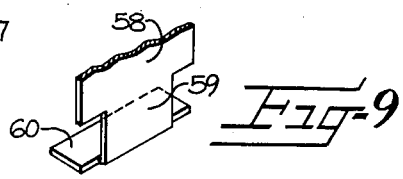

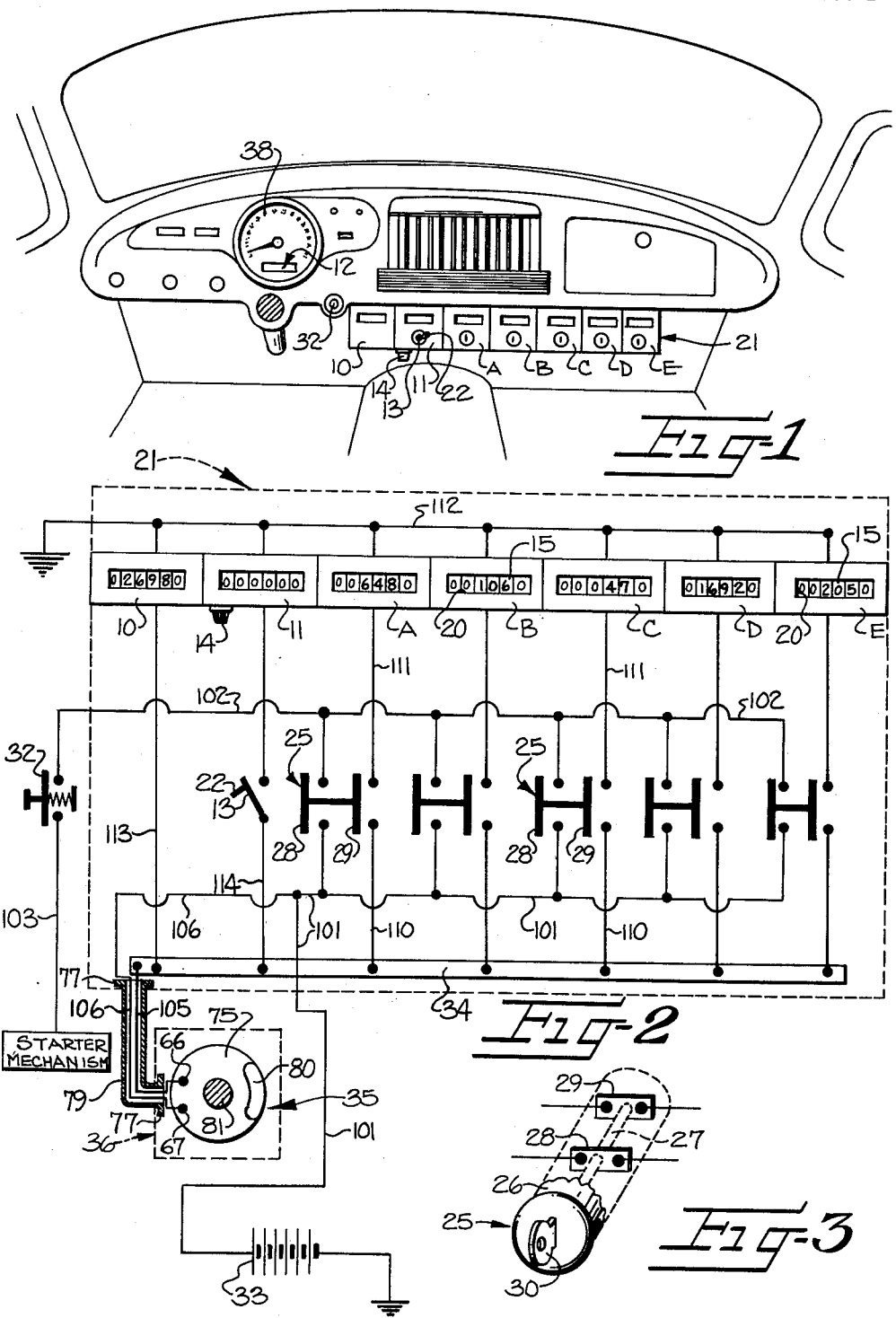
April 20, 1965     R. H. PECKWORTH     3,179,336
MULTI-ODOMETER FOR VEHICLES
Filed Feb. 18, 1963     3 Sheets-Sheet 1

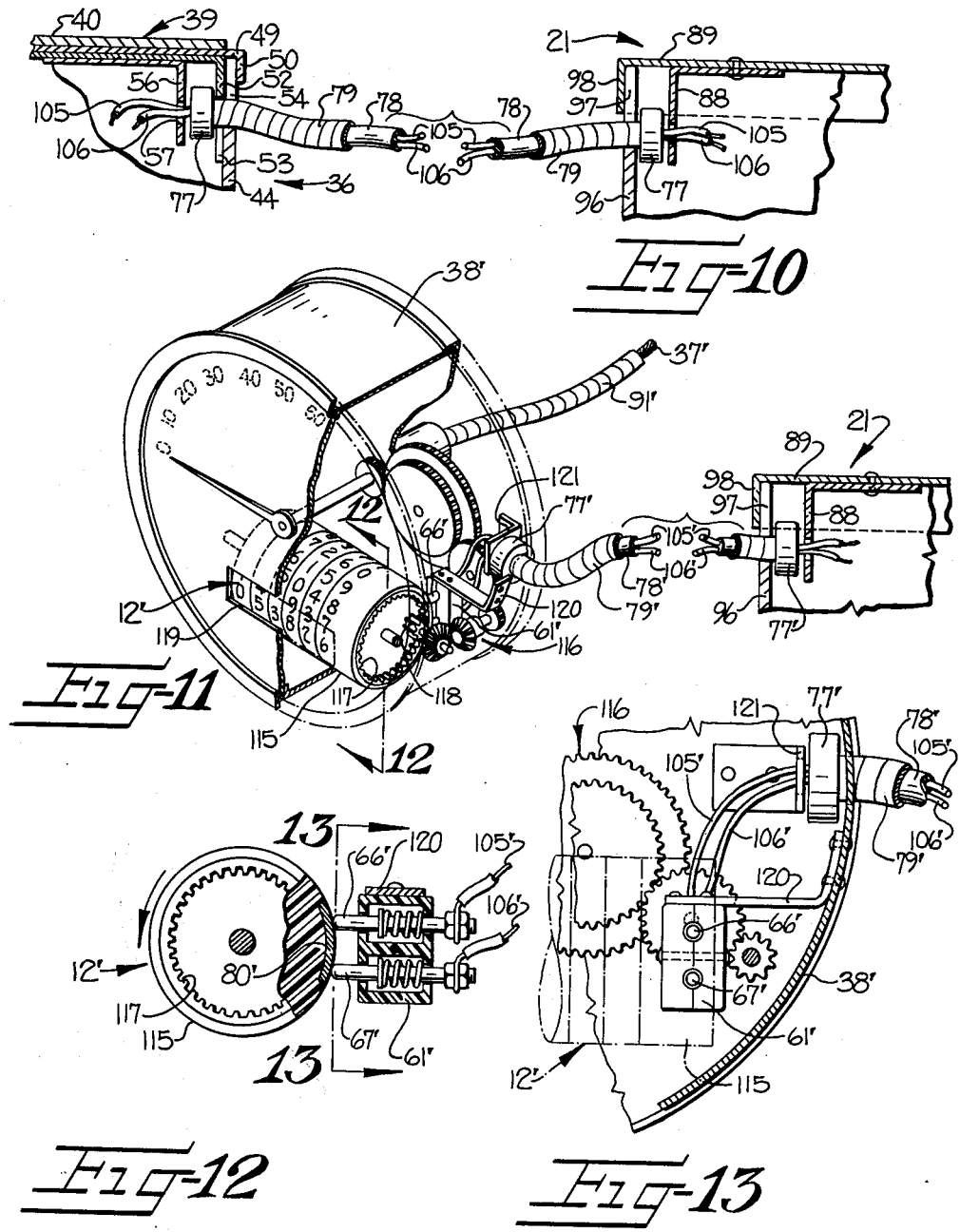

United States Patent Office 3,179,336
Patented Apr. 20, 1965

3,179,336
MULTI-ODOMETER FOR VEHICLES
Ralph H. Peckworth, 1920 The Plaza, Charlotte, N.C.
Filed Feb. 18, 1963, Ser. No. 259,187
2 Claims. (Cl. 235—97)

The present invention relates to a novel multi-odometer for a vehicle, and more particularly to a mechanism comprising a plurality of independently operable odometers adapted to be installed in an automobile for separately registering the mileage driven by two or more operators.

The operating expenses of an automobile have long been an important consideration whether the automobile is used for business purposes or for personal convenience. When an automobile is used for business purposes, frequently two or more operators will be assigned to the automobile, and separate records are maintained by each of the operators as to mileage driven, consumption of gasoline and lubricating oil, and the particular purpose for each business trip taken by an operator of the automobile. This sharing of an automobile for business purposes can also be applied to personal usage of the automobile where two or more persons may desire to share the operating expenses of an automobile for reasons of economy. In the latter respect, the increasing costs of purchasing and operating an automobile have caused a financial burden of substantial magnitude to be assumed by many persons where the definite need for an automobile exists, whether for business purposes or personal convenience.

While there is a clear economic advantage in dividing the expenses of owning and operating an automobile between two or more persons, arrangements of this type have been impractical heretofore because of the difficulty in equitably apportioning the operating expenses of the automobile between the individual users thereof.

It is therefore an object of this invention to provide a novel mechanism in a commonly-owned or commonly-used vehicle for accurately determining the proportionate use of the vehicle by each of the individual operators thereof.

It is another object of this invention to provide a novel multi-odometer to be incorporated in a vehicle comprising a plurality of independently key-operated odometers which are individually and selectively controlled by particular keys corresponding thereto, the individual odometers being connected into the electrical starter circuit for the vehicle in parallel so as to require an operator of the automobile to render his personal odometer operable by employing his key for closing a switch in the electrical starter circuit to allow the electrical starter circuit to be subsequently completed before the vehicle can be driven. In this way, an accurate record of the mileage driven by each operator of the vehicle is provided by the odometer assigned to that operator so that an equitable apportionment of the operating expenses of the vehicle between the individual users thereof can be made.

It is another object of this invention to provide in a multi-odometer for vehicles as described, a novel electric counter switch comprising a rotatable member having an electrically conductive surface thereon for intermittent engagement with contact members to complete an electrical circuit controlling the movement of the counter members in a selected odometer for registering the mileage driven by an operator of the vehicle on the odometer assigned to that operator. In accordance with the invention, it is contemplated that the electric counter switch may be contained within a tamper-proof housing with the rotatable member having the electrically conductive surface thereon being mounted about a shaft connected into the driving mechanism for the usual odometer of the vehicle where the multi-odometer is to be installed in a vehicle equipped with a conventional odometer. The electric counter switch may also be so constructed as to operate directly from the main odometer of the vehicle, this latter form of my invention being particularly applicable as original equipment for new vehicles.

Some of the objects of the invention having been stated, other objects will appear as the description proceeds when taken in connection with the accompanying drawings, in which—

FIGURE 1 is a perspective view of the dashboard of an automobile showing the multi-odometer installed thereon in accordance with the present invention;

FIGURE 2 is a schematic view of the electrical wiring diagram connecting the multi-odometer into the electrical starter circuit of the automobile;

FIGURE 3 is an enlarged fragmentary perspective view, partially broken away for purposes of clarity, of one of the key-operated lock switches associated with an individual odometer of the multi-odometer, as illustrated in the wiring diagram of FIGURE 2;

FIGURE 4 is a longitudinal vertical sectional view of an electric counter switch device adapted to intermittently complete an electrical circuit controlling the movement of the counter members in a selected odometer for registering the mileage driven by an individual operator thereon in accordance with the present invention;

FIGURE 5 is a transverse vertical sectional view taken along the line 5—5 in FIGURE 4;

FIGURE 6 is a transverse vertical sectional view taken along the line 6—6 in FIGURE 4;

FIGURE 7 is an enlarged fragmentary horizontal sectional view taken along the line 7—7 in FIGURE 4;

FIGURE 8 is a perspective view of the electric counter switch device of FIGURE 4;

FIGURE 9 is a fragmentary perspective view of one of the components of the electric counter switch device;

FIGURE 10 is a fragmentary transverse vertical sectional view, partially broken away, and showing the electrical connection between the electric counter switch device of FIGURE 4 and a casing containing the individual odometers comprising the multi-odometer;

FIGURE 11 is a perspective view, partially broken away, of a main odometer and speedometer associated therewith for a vehicle, and showing a modified form of electric counter switch device for the multi-odometer in accordance with the present invention, wherein the electric counter switch device is directly operated from the main odometer;

FIGURE 12 is a fragmentary transverse vertical sectional view taken along the line 12—12 in FIGURE 11; and FIGURE 13 is a enlarged fragmentry vertical sectional view taken along the line 13—13 in FIGURE 12.

Referring more specifically to the drawings, it will be observed that the multi-odometer in accordance with the present invention comprises a plurality of independently operable register units or odometers identified by reference characters A, B, C, D, and E, respectively, which are installed in a vehicle. While five independently operable register units are illustrated in the drawings, it will be understood that a smaller or larger number of independently operable register units may be installed in a vehicle. Besides the plurality of independently operable register units A–E, inclusive, my multi-odometer preferably includes two additional odometers or register units 10, 11. The register unit 10 is arranged to be simultaneously operable with any one of the independently operable register units A–E, inclusive, selected for operation in a manner to be described. Thus, it is contemplated that the register unit 10 will be continuously operable when the vehicle is driven to comprise a total mileage meter reflecting the sum of the individual mileages recorded on all of the independently operable register units A–E, inclusive, so that the total mileage recorded by my multi-odometer can be checked against the mileage recorded on the conventional or main odometer 12 of the vehicle for accuracy. The register unit 11 serves as an optional trip meter which may be rendered operable by closing a manual switch 13 to register the mileage driven while any one of the independently operable register units A–E, inclusive, is selectively operated. The trip meter 11 has a reset knob 14 associated therewith which may be manually rotated to reset the mileage recorded on the trip meter 11 to zero.

It will be understood that each one of the register units comprising my multi-odometer, including the independently operable register units A–E, inclusive, the total mileage meter 10, and the trip meter 11, has a number of movable counter members for recording mileage in the usual manner. In this connection, the movable counter members for each of the register units comprise a plurality of rotatable counter wheels 15 bearing the digits "zero" through "nine" about the circumference thereof so as to register a digit thereon which can be seen through the narrow horizontal slot 20 provided for each of the odometers or register units comprising my multi-odometer. For example, the register units may comprise conventional electrically-operable Veeder-Root magnetic counters of the type shown and described in a Veeder-Root publication dated October 1956 and designated "Form 227530."

For supporting and housing my multi-odometer to conveniently install it on the dashboard of a vehicle, such as an automobile, some form of horizontally elongated housing or casing 21 is preferably provided, the front wall of the casing 21 forming the face plate of the multi-odometer and including the narrow horizontal slots 20 therein through which may be seen the mileage recorded on the individual register units of the multi-odometer by the counter wheels 15 therefor. The front wall or face plate of the multi-odometer casing 21 further includes circular openings therein beneath the slots 20 corresponding to the independently operable register units A–E, inclusive, and the trip meter 11. The circular opening beneath the slot 20 corresponding to the trip meter 11 receives the manually operable switch 13 for optionally rendering the trip meter 11 operable upon being closed, it being noted in FIGURE 1 that the manually operable switch 13 includes a lever arm 22 disposed outwardly of the front wall or face plate of the multi-odometer casing 21 so as to be readily accessible for opening and closing the manually operable switch 13 controlling the operation of the trip meter 11 upon appropriate manipulation of the lever arm 22.

The circular openings in the face plate of the multi-odometer casing 21 positioned beneath the horizontal slots 20 corresponding to the independently operable register units A–E, inclusive, are adapted to receive a series of key-operated lock switches 25, one for each of the independently operable register units A–E, inclusive. The wiring diagram in FIGURE 2 schematically shows these lock switches 25 as being of the push-pull "on-off" type for simplifying the illustration of the wiring diagram, but it will be understood that each of the key-operated lock switches 25 is of the type more particularly illustrated in FIGURE 3. In this connection, each of the lock switches 25 includes a cylinder 26 rotatably mounted within a sleeve (not shown) which is fixedly secured in a circular opening provided in the face plate of the multi-odometer casing 21 and extends within the casing 21. The rotatable cylinder 26 contains an elongate spindle 27 movable therewith on which are carried a pair of spaced switch plates 28, 29 having switch contacts at the opposite ends thereof. A key hole is provided in the end of the rotatable cylinder 26 exposed by the circular opening in the face plate of the multi-odometer casing 21. The key hole in the rotatable cylinder 26 receives a particular key 30 corresponding thereto, which upon being inserted into the key hole releases the lock switch 25 to permit turning of the rotatable cylinder 26 for moving the lock switch 25 to its unlocked position closing the switches associated therewith by bringing the contacts on the plates 28, 29 carried by the spindle 27 into engagement with corresponding terminals in the electrical wiring for the multi-odometer.

Normally, the starter mechanism for a vehicle is actuated by unlocking the ignition and momentarily closing a manual starter switch wired in series with the starter mechanism and a battery providing a source of electric power. In the present instance, the wiring diagram of FIGURE 2 schematically shows a combined ignition-starter switch 32 as a push-button switch for purposes of simplicity, wherein it is assumed that the ignition switch has been manually closed either with or without the use of a separate master key and the push-button switch 32 represents the starter switch for the vehicle with the ignition switch already closed. It should be understood that the switch 32 shown in the wiring diagram of FIGURE 2 is for illustrative purposes only, as the conventional type of combined ignition-starter switch now found on most modern-day automobiles is intended to be schematically represented by the switch 32 of FIGURE 2. As is well known, the latter type of ignition-starter switch is provided with a rotatable cylinder similar to the rotatable cylinders 26 of the lock switches 25. The rotatable cylinder of the ignition-starter switch may be manually turned with or without the use of a separate master key, as desired, to unlock the ignition, permitting subsequent continued manual turning of the rotatable cylinder in the same direction to close the starter switch for actuating the starter mechanism to begin the operation of the internal combustion engine (not shown) for the automobile. Upon subsequently releasing the rotatable cylinder of the ignition-starter switch 32, the rotatable cylinder is allowed to turn in the opposite direction to the "on" position of the ignition switch while opening the starter switch in the well-known manner.

In accordance with the present invention, the closing of the starter switch of the combined ignition-starter switch 32 in the manner previously described will not actuate the starter mechanism to start the internal combustion engine (not shown) unless one of the independently operable register units A–E, inclusive, has been selectively rendered operable by inserting a particular key 30 in the key hole of the lock switch 25 corresponding thereto and turning the rotatable cylinder 26 to bring the contacts on the plates 28, 29 into respective engagement with the corresponding terminals in the electrical wiring for the multi-odometer. This initially prepares the electrical starter circuit for subsequent completion upon the closing of the starter switch of the combined ignition-starter switch 32 which actuates the starter mechanism associated therewith to begin operation of the internal combustion engine. Additionally, the independently operable register unit corresponding to the unlocked lock switch 25 is selectively rendered operable for recording mileage thereon as will be described hereinafter.

As shown in FIGURE 2, the electrical wiring is tied into a battery 33 providing a source of electric power. Preferably, an elongate electrically conductive bus bar 34 is included in the electrical wiring, the bus bar 34 having a plurality of terminals to which respective ends of wire conductors leading to the independently operable register units A–E, inclusive, the total mileage meter 10, and the trip meter 11 are connected. It will be further observed that an electric counter switch device or impulse switch 35 is serially wired to the bus bar 34 and the battery 33, the electric counter switch 35 being intermittently closed in a manner to be presently described for completing a counter control electrical circuit corresponding to a selected one of the independently operable register units A–E, inclusive, to rotate the counter members 15 thereof in a predetermined sequence for registering the mileage driven on the selected one of the register units A–E, inclusive.

The electric counter switch 35 is shown more particularly in FIGURES 4–9, inclusive, and comprises a composite housing 36 interposed between the usual flexible shaft or cable 37 driving the main odometer 12 and the speedometer 38 of the vehicle associated therewith. The composite housing 36 includes an integral wrap-around shell 39 and a substantially channel-shaped housing member 43. The shell 39 comprises a top wall 40, a bottom wall 41, and end walls 42, 42, but is provided with open opposite sides. The substantially channel-shaped housing member 43 has side walls 44, 44 and a bottom wall 45 connecting the side walls 44, 44. The side walls 44, 44 of the substantially channel-shaped housing member 43 cover the open opposite sides of the shell 39 and engage the opposite side edges of the end walls 42, 42 thereof to form the housing enclosure, while the bottom wall 45 of the housing member 43 lies beneath the bottom wall 41 of the shell 39 and is releasably secured thereto by suitable means, such as screws 46, 46. It will be observed that the bottom wall 45 of the channel-shaped housing member 43 extends longitudinally beyond the end walls 42, 42 of the shell 39 and terminates in vertically upright flanges 47, 47 at the opposite ends thereof. Each of the upright flanges 47, 47 on the channel-shaped housing member 43 is provided with an upwardly opening vertical notch 48.

The composite housing 36 of the electric counter switch 35 further includes a housing plate 49 which is substantially coextensive with the top wall 40 of the shell 39 and is fixedly secured therebeneath. A pair of integral dependent marginal flanges 50, 50 are provided on the housing plate 49 along the opposite sides thereof. It will be observed that the side walls 44, 44 of the channel-shaped housing member 43 have upper end edges disposed below the top wall 40 of the shell 39 so as to define longitudinal openings extending along the opposite sides of the composite housing 36 adjacent the top wall 40 of the shell 39. These longitudinal openings receive the housing plate 49 therethrough with the marginal flanges 50, 50 of the housing plate 49 being respectively disposed in overlapping relation to the upper marginal portions of the side walls 44, 44 of the composite housing 36 provided by the channel-shaped housing member 43.

A first or upper bracket member is mounted within the housing 36 beneath the housing plate 49, the upper bracket member having a horizontally disposed base portion 51 secured to the housing plate 49 and a vertically dependent flange 52 (FIGURE 6) integral with one side of the bracket base 51 and extending downwardly adjacent to one of the side walls 44. The vertically dependent flange 52 of the upper bracket member is provided with a downwardly opening vertical slot 53 therein for cooperation with an upwardly opening vertical slot 54 formed in the side wall 44 adjacent thereto. In this connection, the vertical slots 53 and 54 are disposed in partial registration with each other to provide a restricted opening into the housing 36 through the side wall 44 thereof adjacent the dependent flange 52 of the upper bracket member.

A second or lower bracket member is mounted within the housing 36 beneath the upper bracket member, the lower bracket member having a horizontally disposed base portion 55 secured to the base portion 51 of the upper bracket member and a vertically dependent flange 56 (FIGURE 6) integral with one side of the bracket base 55 and extending downwardly within the housing 36 in inwardly spaced parallel relation to the dependent flange 52 of the upper bracket member. An aperture 57 is formed in the dependent flange 56 of the lower bracket member, the aperture 57 being in registration with the restricted opening into the housing 36 provided by the partially registered vertical slots 53 and 54 in the dependent flange 52 of the upper bracket member and the side wall 44 adjacent to the dependent flange 52. The lower bracket member further includes an integral carrier or support for a switch contact member to be hereinafter described, the support comprising a vertically dependent leg 58 integral with the rear end of the base portion 55 of the lower bracket member and terminating in a rearwardly directed horizontally disposed ledge 60 (FIGURE 9). The dependent leg 58 includes an integral leg connector portion or neck 59 of reduced transverse width which forms its juncture with the horizontal ledge 60.

The switch contact member carried by the vertically dependent leg 58 and the horizontal ledge 60 of the lower bracket member is designated by the reference numeral 61 and comprises a housing of suitable insulation material in which are embedded a pair of spaced apart contact pins 66, 67 of electrically conductive material. The contact pins 66, 67 have enlarged heads exposed at one end surface of the insulating housing 61 and respectively extend through the insulating housing 61, with their ends opposite from the exposed contact heads thereon being connected to wire conductors 105, 106 leading from the housing 36 of the electric counter switch 35 into the casing 21 containing the plurality of register units A–E, inclusive, and 10, 11.

The insulating housing 61 is of two-piece construction and includes a block 68 of insulation material having a recess 69 in the end thereof remote from the exposed contact heads of pins 66, 67 and a plate 70 of insulation material secured across the end of the block 68 having the recess 69 therein. The recessed block 68 and the plate 70 cooperate to define an elongate vertically extending passageway or throat through the insulating housing 61 for reception of the leg connector portion 59 of the lower bracket member. The insulating housing 61 is supported on the horizontal ledge 60 of the lower bracket member and is restrained from rotation by the leg connector portion 59 of the lower bracket member which passes through the vertical throat formed therein.

The block 68 is also provided with a pair of blind bores 71, 71 opening into the recess 69. Coil springs 72, 72 are received in the bores 71, 71, the coil springs 72, 72 being seated at their opposite ends against the leg connector portion 59 of the lower bracket member and the blind or closed ends of the bores 71, 71 so as to bias the insulating housing 61 toward a rotatable member 75 located rearwardly of the insulating housing 61 to provide for continuous engagement between the exposed contact heads of the pins 66, 67 and the surface of the rotatable member 75 opposed thereto.

The electrical wiring comprising the wire conductors 105, 106 connected to the contact pins 66, 67 extends into the composite housing 36 of the electric counter switch 35 through the restricted opening formed by the partially registered slots 54, 53 in the side wall 44 of the housing 36 and the adjacent dependent flange 52 of the upper bracket member within the housing 36, from where the wire conductors 105, 106 are passed through the aperture 57 (FIGURE 6) formed in the dependent flange 56 of the lower bracket member and connected to the contact pins 66, 67.

It will be observed that the wire conductors 105, 106 electrically connect the independently operable register units A–E, inclusive, to the electric counter switch 35 through the respective key-operated lock switches 25. As best shown in FIGURE 10, the portions of the wire conductors 105, 106 extending between the housing 36 of the electric counter switch 35 and the casing 21 containing all of the register units are covered by a thick, flexible protective jacket whose opposite ends terminate in enlarged collars 77, 77 respectively received within the housing 36 of the electric counter switch 35 and the multi-odometer casing 21. The protective jacket for the portions of the wire conductors 105, 106 extending between the housing 36 and the casing 21 preferably comprises an inner layer 78 of insulation material surrounding the wire conductors 105, 106 and an outer metallic armor sheath 79 spirally wound about the insulation layer 78.

The enlarged collar 77 on the end of the protective jacket received within the housing 36 of the electric counter switch 35 is positioned in the space between the parallel dependent flanges 52, 56 of the upper and lower bracket members. The enlarged collar 77 on the other end of the protective jacket received within the multi-odometer casing 21 is mounted in a similar manner to be positioned in a space between a vertically dependent bracket flange 88 secured to the cover 89 of the casing 21 and a casing wall 96 parallel to the bracket flange 88. It will be noted that the casing wall 96 is provided with an uwardly opening vertical slot 97 for admitting the protective jacket and the enlarged collar 77 thereon into the casing when the casing cover 89 is removed, while the casing cover 89 is provided with an integral dependent marginal flange 98 about its perimeter which partially overlies the vertical slot 97 in the casing wall 96 when the casing cover 89 is in closed position. The bracket flange 88 is apertured to admit the wire conductors 105, 106 therethrough from where the wire conductors 105, 106 are respectively connected to the bus bar 34 and the key-operated lock switches 25 within the multi-odometer casing 21. The enlarged collars 77, 77 at the opposite ends of the protective jacket for the portions of the wire conductors 105, 106 extending between the housing 36 and the casing 21 are of sufficient diameter to prevent the electrical wiring from being removed from the housing 36 and the casing 21, or from being pushed further thereinto, when the multi-odometer is fully assembled. Thus, the multi-odometer comprises a package assembly including the casing 21 and the housing 36 which are connected by the portions of the wire conductors 105, 106 covered by the insulation layer 78 and the metallic armor sheath 79 forming the protective jacket thereabout, with the casing 21 containing the plurality of register units A–E, inclusive, 10, 11 and the key-operated lock switches 25 for the independently operable register units A–E, inclusive, and the housing 36 containing the components of the electric counter switch 35.

The rotatable member 75 of the electric counter switch 35 is in the form of an enlarged circular disc having a surface opposed to the exposed heads of the contact pins 66, 67 for continuous engagement therewith. The rotatable disc 75 is provided with an arcuate electrically-conductive strip 80 (FIGURE 5) which forms a portion of its circumference on the surface engaged by the pins 66, 67 for completing a counter control electrical circuit during each revolution of the rotatable disc 75 when the electrically-conductive strip 80 is disposed in a position engaging both of the exposed heads of the contact pins 66, 67. The rotatable disc 75 is mounted about a power take-off shaft 81 for rotation therewith, the power take-off shaft 81 extending through the housing 36 of the electric counter switch 35 and being drivingly connected at its opposite ends to the flexible shaft or cable 37 and the driven shaft 82 which operates the main odometer 12 and the speedometer 38 of the vehicle associated therewith.

The opposite ends of the power take-off shaft 81 are journaled in bushings 83, 84 which are received within suitable openings formed in the end walls 42, 42 of the housing 36 for the electric counter switch 35. It will be observed that the bushing 83 is threaded onto a fitting 85 fixedly secured to the housing for the speedometer 38 and main odometer 12, the bushing 83 further including a trailing externally threaded portion extending into the housing 36 of the electric counter switch 35. A jamb nut 86 is threaded onto the trailing externally threaded portion of the bushing 83 into abutting engagement with the forwardly disposed end wall 42 of the housing 36 for securing the electric counter switch mechanism 35 in place. The bushing 84 includes an enlarged flat-sided hexagonal collar portion disposed within the housing 36 and in abutting engagement with the rearwardly disposed end wall 42 thereof and a rearwardly extending externally threaded nipple protruding outwardly of the rear end wall 42 of the housing 36. A fitting in the form of a threaded thimble 87 is tightened about the threaded nipple of the bushing 84 to clamp an enlarged end collar 90 of a spirally-wound cylindrical sleeve 91 covering the cable 37 between the thimble 87 and the rear end of the bushing 84. The bushing 83 and the fitting 85 adjustably securing the housing 36 of the electric counter switch 35 to the housing for the speedometer 38 and main odometer 12 are received within the vertical slot 48 formed in the forwardly disposed upright flange 47 of the channel-shaped housing member 43, while the spirally-wound cylindrical sleeve 91 containing the cable 37 is received within the vertical slot 48 formed in the rearwardly disposed upright flange 47 of the channel-shaped housing member 43.

A rotation-restraining member 93 in the form of a vertical plate having a bifurcated lower end and an integral horizontal mounting flange on its upper end is provided within the housing 36 of the electric counter switch 35. The vertical plate 93 is fixedly secured to the housing plate 49 and the top wall 40 of the housing 36 by its horizontal mounting flange to depend therefrom adjacent to the rear end wall 42 of the housing 36, suitable fastener means, such as a rivet, penetrating the mounting flange of the vertical plate 93, the housing plate 49, and the top wall 40 of the housing 36 to fixedly secure the vertical plate 93 within the housing 36. The bifurcated lower end of the vertical plate 93 defines a downwardly opening recess in the vertical plate 93 which has upwardly convergent flat bottom wall portions 94, 94. These flat bottom wall portions 94, 94 of the recess in the vertical plate 93 cooperate with straight inner marginal edges on the legs 95, 95 provided by the bifurcation of the lower end of the vertical plate 93 to restrain rotation of the bushing 84 whose enlarged flat-sided hexagonal collar portion is received in the recess with the legs 95, 95 of the vertical plate 93 in straddling relation thereto (FIGURE 5).

As shown in FIGURE 4, the housing plate 49 and the horizontally disposed base portions 51, 55 of the upper and lower bracket members are arranged in stacked relationship beneath the top wall 40 of the housing 36 to which they are fixedly secured by suitable fastener means, such as rivets.

The assembly of the electric counter switch 35 is completed by a tamper-detection seal which comprises a wire 99 and a lead tag 100. The wire 99 is threaded through suitable apertures formed in one of the side walls 44 and the rear end wall 42 of the housing 36, and the opposite ends of the wire 99 are embedded in the lead tag 100 which is located outwardly of the housing 36 for the electric counter switch 35 and bears the impression of suitable indicia thereon to prevent unauthorized access into the interior of the housing 36. In this connection, it will be apparent that the screws 46, 46 releasably securing the bottom wall 45 of the channel-shaped housing member 43 to the bottom wall 41 of the shell 39 must be removed, and the channel-shaped housing member 43 must be withdrawn from the shell 39 to expose the interior of the housing 36. The withdrawal of the channel-shaped housing member 43 from the shell 39 cannot be accomplished without first breaking apart the lead tag 100 in which the opposite ends of the wire 99 are embedded to release the ends of the wire 99 for subsequently removing the wire 99 from the apertures in the side wall 44 and the rear end wall 42 of the composite housing 36 provided by the channel-shaped housing member 43 and the shell 39, respectively. Of course, the lead tag 100, if broken, readily indicates that someone may have tampered with the electric counter switch 35.

Rotation is imparted to the power take-off shaft 81 through the flexible shaft or cable 37 which is rotated in the usual manner in accordance with the speed of the vehicle. Thus, the circular disc 75 is rotated with the power take-off shaft 81, and its electrically conductive arcuate strip 80 is brought into simultaneous engagement with the exposed heads of both of the contact pins 66, 67 of the non-rotatable switch contact member 61 during each complete revolution of the circular disc 75 to intermittently complete a counter control electrical circuit for a selected one of the independently operable register units A–E, inclusive. It is contemplated that a suitable gear-reduction mechanism (not shown) may be employed to reduce the speed of the circular disc 75 with respect to the power take-off shaft 81 to prevent completion of a counter control electrical circuit by bridging the space between the contact pins 66, 67 with the electrically conductive arcuate strip 80 at intervals too frequent to permit the mechanism rotating the counter members 15 of the selected one of the independently operable register units A–E, inclusive, to keep pace with the number of electrical impulses received—there being one such electrical impulse each time the counter control electrical circuit is completed.

Turning now to a more specific discussion of the electrical wiring diagram illustrated in FIGURE 2, the electrical wiring diagram includes an electrical starter circuit which may take a plurality of forms corresponding in number to the number of independently operable register units A–E, inclusive, and a plurality of independent counter control electrical circuits for the counter members 15 of each of the independently operable register units A–E, inclusive.

Electrical starter circuit

The electrical starter circuit can be traced from the battery 33 through a wire conductor 101, through a selected one of the lock switches 25 which has been closed to a wire conductor 102 leading to one terminal of the ignition-starter switch 32, and across the switch 32 when closed to the other terminal thereof from where the circuit continues through a wire conductor 103 to the starter mechanism identified by the diagrammed box so designated. The lock switches 25 respectively corresponding to the independently operable register units A–E, inclusive, are wired in parallel across the wire conductors 101 and 102. Thus, the electrical starter circuit can only be completed by closing the starter switch 32 after any selected one of the lock switches 25 has been closed to position the plate 28 thereof across spaced apart terminals linking the wire conductors 101 and 102.

Counter control electrical circuits

The counter control electrical circuits correspond in number to the number of independently operable register units A–E, inclusive, and one of the counter control electrical circuits is selectively completed by the unlocking of one lock switch 25 and the simultaneous engagement of the electrically-conductive arcuate strip 80 with the exposed heads of both contact pins 66, 67 of the non-rotatable switch contact member 61 for the electric counter switch 35 which occurs once during each complete revolution of the circular disc 75. In this connection, each of the independently operable register units A–E, inclusive, is tied into an independent counter control electrical circuit by a wire conductor 110 connected at one end to the bus bar 34 and at its opposite end to a terminal spaced from another terminal to which one end of a wire conductor 111 extending through the particular one of the register units A–E, inclusive, is connected. Upon closing one of the lock switches 25, its plate 29 will be positioned across the spaced apart terminals to which the wire conductors 110 and 111 are connected. The counter control electrical circuit for a selected register unit A–E, inclusive, corresponding to the unlocked or closed lock switch 25 is thereby rendered operable, and subject to intermittent completion whenever the electrically-conductive arcuate strip 80 on the rotatable circular disc 75 simultaneously engages the exposed heads of both of the contact pins 66, 67 to energize the mechanism for rotating the counter members 15 of the particular register unit A–E, inclusive, selected in a predetermined sequence for recording the mileage driven thereon. Thus, each counter control electrical circuit can be traced from the battery 33 through wire conductor 101 to a point where wire conductor 106 is connected thereto, and then through wire conductor 106, across the spaced contact pins 67, 66 through the bridging electrically-conductive arcuate strip 80, through the wire conductor 105 to the bus bar 34, through the wire conductor 110, and through the switch plate 29 of the selected closed lock switch 25 across the spaced apart terminals to which the wire conductors 110 and 111 are connected, from where the circuit continues through the wire conductor 111 to the selected one of the independently operable register units A–E, inclusive, corresponding to the closed lock switch 25 and to a grounded wire conductor 112 common to all of the independently operable register units A–E, inclusive.

In FIGURES 11–13, inclusive, a modified form of electric counter switch device 35' for my multi-odometer is illustrated. Components of the modified electric counter switch device 35' illustrated in FIGURES 11–13, inclusive, which correspond to components of the electric counter switch device 35 of FIGURES 1–10, inclusive, have been identified by the same reference numerals with the prime notation added. The modified electric counter switch device 35' is adapted to be directly operated from the main odometer 12' of the vehicle so as to be particularly applicable for use as original equipment for new vehicles. In this latter connection, it will be observed that the rotatable counter wheel 115 at one end of the main odometer 12' includes an outer cylindrical surface of increased axial length as compared to the other rotatable counter wheels of the main odometer 12'. The counter wheel 115 includes the digits "zero" through "nine" about the circumference thereof disposed to one side of its outer cylindrical surface and registers individual tenths of a mile. The counter wheel 115 is constructed of a non-conductive material, and the other side of its outer cylindrical surface is blank. The narrow horizontal slot 119 of the odometer 12' exposes the numbered side of the counter wheel 115 to view along with the other counter wheels of the main odometer 12', but preferably stops short of the blank side of the counter wheel 115 which is accordingly shielded so that the visible portion of the main odometer 12' through the slot 119 is substantially unchanged in appearance from the appearance of a conventional odometer.

The respective counter wheels of the main odometer 12' are rotatably driven in their proper sequence in a conventional manner from a driving mechanism 116 including the usual flexible shaft or cable 37' having a spirally wound cylindrical sleeve 91' as a protective jacket. In this respect, it will be noted that the outer end face of the thickened counter wheel 115 is provided with a circular recess bounded by radially inwardly directed teeth forming a gear 117 which meshes with a pinion gear 118 of the driving mechanism 116 so as to drive the counter wheel 115 from the driving mechanism 116.

The rotatable member of the modified electric counter switch 35' illustrated in FIGURES 11–13, inclusive, comprises the blank side of the thickened counter wheel 115, and thus has a cylindrical surface opposed to a pair of spring-biased electrically-conductive contact pins 66', 67' for continuous engagement therewith. The cylindrical surface portion on the blank side of the thickened counter wheel 115 is provided with an arcuate electrically-conductive strip 80' (FIGURE 12) about a portion of its circumference. During each revolution of the counter wheel 115, it will be understood that a counter control electrical circuit is completed when the electrically-conductive strip 80' is disposed in a position simultaneously engaging both of the contact pins 66', 67' to bridge the space therebetween. The selected one of the independently operable register units A–E, inclusive, corresponding to the counter control electrical circuit which is intermittently completed in the manner described, is thereby actuated to record mileage thereon by appropriate rotation of one or more of its counter members 15. While a single thickened counter wheel 115 has been shown and described as performing the dual function of serving as the counter member of the odometer 12' registering individual tenths of a mile and serving as the rotatable member of the modified electric counter switch 35', it is contemplated that the counter wheel 115 may be of a standard thickness comparable to the other counter wheels of the odometer 12' and that a separate disc of non-conductive material and having an arcuate electrically-conductive strip may be rigidly affixed to the counter wheel 115.

The insulating housing 61' in which the contact pins 66', 67' are slidably mounted is itself fixedly mounted within the cup-like speedometer receptacle or housing 38' in a suitable manner, such as by bracket 120. As in the first form of the invention, the wire conductors 105', 106' are respectively connected to the contact pins 66', 67' for electrically connecting the independently operable register units A–E, inclusive, to the electric counter switch 35' through the respective key-operated lock switches 25. As shown in FIGURE 11, the portions of the wire conductors 105', 106' extending between the speedometer housing 38' in which the modified electric counter switch 35' is mounted and the casing 21 containing all of the register units are covered by a thick, flexible protective jacket comprising an inner insulation layer 78' an outer metallic armor sheath 79' spirally wound about the insulation layer 78' and terminating at its opposite ends in enlarged collars 77', 77' respectively received within the speedometer housing 38' and the multi-odometer casing 21.

In a manner similar to the first-described form of the invention illustrated in FIGURES 1–10, inclusive, and more particularly shown in FIGURE 10, the enlarged collar 77' on the end of the protective jacket received within the speedometer housing 38' is positioned in the space between the flange 121 of a bracket member secured to the back wall of the speedometer housing 38' and the substantially cylindrical wall of the speedometer housing 38'. The enlarged collar 77' on the other end of the protective jacket is correspondingly received within the multi-odometer casing 21, as earlier noted in describing FIGURE 10 of the first form of the invention. It will therefore be understood that the multi-odometer equipped with the modified electric counter switch device 35' of FIGURES 11–13, inclusive, like the first form of the invention illustrated in FIGURES 1–10, inclusive, comprises a package assembly including the speedometer housing 38' and the multi-odometer casing 21 which are connected by the portions of the wire conductors 105', 106' covered by the insulation layer 78' and the metallic armor sheath 79' forming the protective jacket thereabout. In this latter instance, the speedometer housing 38' contains the main odometer 12' for the vehicle and its counter wheel 115 along with other components of the modified electric counter switch 35'.

My multi-odometer utilizing either form of electric counter switch device provides a mechanism which accurately records the mileage driven on independently operable odometers by each of the individual operators of the vehicle to readily ascertain the most equitable apportionment of the operating expenses of the vehicle between the users thereof. Closing of the main ignition switch to permit subsequent closing of the starter switch may be accomplished with or without the use of a master key, as previously indicated. However accomplished, the closing of the main ignition switch must be accompanied by the unlocking of one of the lock switches 25 by an operator having the key 30 therefor before the vehicle can be started by momentarily closing the starter switch to complete the electrical starter circuit.

Assuming the operator assigned to odometer A desires to operate the vehicle, he inserts his key 30 in the key hole of the rotatable cylinder 26 for the lock switch 25 corresponding to odometer A and turns the rotatable cylinder 26 to bring the switch plates 28, 29 thereof into contacting engagement across respective terminals for completing the electrical starter circuit upon subsequent closing of the starter switch 32 and completing a counter control electrical circuit for the odometer A whenever simultaneous engagement of the electrically-conductive arcuate strip 80 or 80' with the exposed heads of both of the contact pins 66, 67 or 66', 67' occurs. In this way, the mileage driven by the operator assigned to odometer A is exclusively recorded upon odometer A, but does not appear upon any of the remaining independently operable odometers B–E, inclusive.

This mileage driven by the operator assigned to odometer A is also recorded upon the total mileage meter 10 which is directly connected to the bus bar 34 and the grounded wire conductor 112 by a wire conductor 113 to be rendered operable whenever any one of the independently operable odometers A–E, inclusive, are rendered operable by the unlocking or closing of the lock switch 25 corresponding thereto. The operator may optionally desire to record this mileage upon the trip meter 11 and can accomplish this by closing the manual switch 13 in wire conductor 114 which connects the trip meter 11 to the bus bar 34 and the grounded wire conductor 112.

In the drawings and specification there have been set forth preferred embodiments of the invention and, although specific terms are employed, they are used in a generic and descriptive sense only and not for purposes of limitation, the scope of the invention being defined in the claims.

I claim:
1. In a vehicle having a main odometer, driving means for the main odometer, and an electrical starter circuit provided with a manually operable starter switch therein for initiating the operation of the vehicle; a multi-odometer comprising
   (a) a plurality of independently operable register units having a number of movable counter members,
   (b) driven means operably connected to the driving means of the main odometer for selectively operating one of said plurality of register units,
   (c) key-operated lock switch means for respectively locking said plurality of independently operable register units and comprising
      (1) a lock associated with the counter members of each of the plurality of independently operable register units and movable to unlocked position,
      (2) a switch disposed in the electrical starter circuit and operably connected to said lock, and
      (3) a key operable to rotate said lock in one direction to unlocked position for simultaneously closing the said switch and connecting the register unit corresponding thereto to said driven means to render the register unit corresponding thereto operable and operable to rotate said lock in the opposite direction to locked position for simultaneously opening the said switch and disconnecting the register unit corresponding thereto from said driven means to render the register unit corresponding thereto inoperable;
   (d) said switches of said key-operated lock switch means being wired in parallel in the electrical starter circuit for the vehicle, and
   (e) the movement of one of said locks by its respective key to unlocked position selectively connecting said register unit corresponding thereto to said driven means and closing the switch in the electrical starter circuit operably connected to said one lock for ren- dering the vehicle operable upon closing of the manually operable starter switch to complete the electrical starter circuit, whereby the movable counter members of said register unit selectively connected to said driven means are driven in a predetermined sequence during movement of the vehicle while the counter members of the other register units are idle.

2. In a vehicle having an electrical starter circuit provided with a manually operable starter switch therein for initiating the operation of the vehicle; a multi-odometer comprising (a) a plurality of independently operable register units, each of said register units having a number of counter members movable when the register unit corresponding thereto is rendered operable, (b) means selectively controlling the operability of each register unit, (c) key-operated lock switch means for respectively locking said plurality of independently operable register units and comprising (1) a lock associated with the counter members of each of the plurality of independently operable register units and movable to unlock position, (2) first and second switches operably connected to said lock, said first switch being disposed in the electrical starter circuit and said second switch being operably connected to said selective control means, (3) a key operable to rotate said lock in one direction to unlocked position for simultaneously closing said first and second switches and operable to rotate said lock in the opposite direction to locked position for simultaneously opening said first and second switches;

(d) said first switches of said key-operated lock switch means being wired in parallel in the electrical starter circuit for the vehicle, and (e) the movement of one of said locks by its respective key to unlocked position closing said first switch in the electrical starter circuit operably connected to said one lock for rendering the vehicle operable upon closing of the manually operable starter switch to complete the electrical starter circuit and closing said second switch to actuate said selective control means for rendering the respective selected register unit corresponding to said one lock operable while the other register units remain inoperable.

References Cited by the Examiner

UNITED STATES PATENTS

| | | | |
|---|---|---|---|
| Re. 14,381 | 10/17 | Kjellhren | 235—92 |
| 1,093,271 | 4/14 | Hopkins | 235—95 |
| 1,101,540 | 6/14 | Hall | 235—92 |
| 1,199,626 | 9/16 | Smithey | 235—95 |
| 1,451,280 | 4/23 | Sundh et al. | 235—103 X |
| 1,801,618 | 4/31 | Spery | 235—92 |
| 2,146,632 | 2/39 | Lamb | 235—103.5 |
| 2,718,448 | 9/55 | Powers | 346—49 |

FOREIGN PATENTS

| | | |
|---|---|---|
| 235,329 | 8/61 | Australia. |

LEYLAND M. MARTIN, *Primary Examiner.*

LEO SMILOW, *Examiner.*